April 9, 1968 V. L. FRANTZ ET AL 3,377,046
SOLENOID VALVE AND METHOD
Filed Oct. 9, 1964
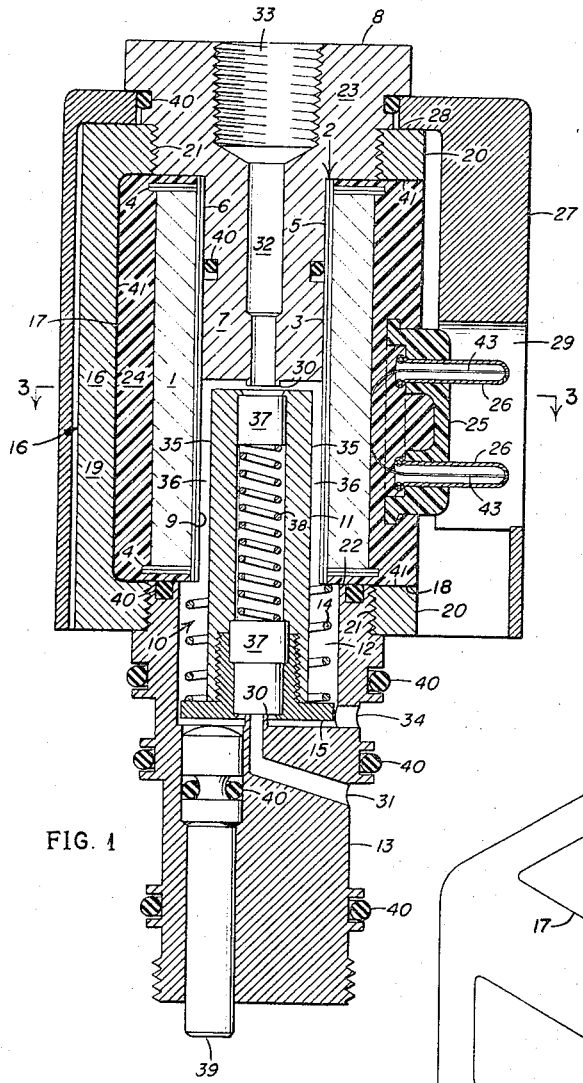
FIG. 1
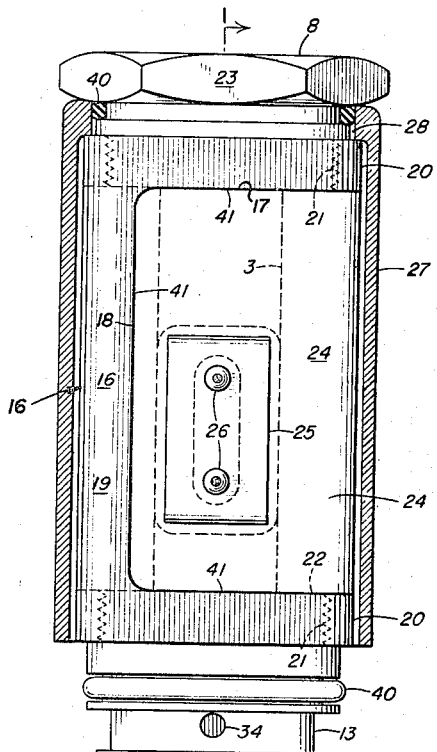
FIG. 2
FIG. 3
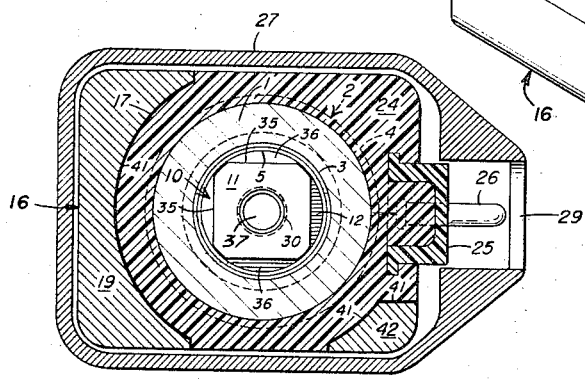
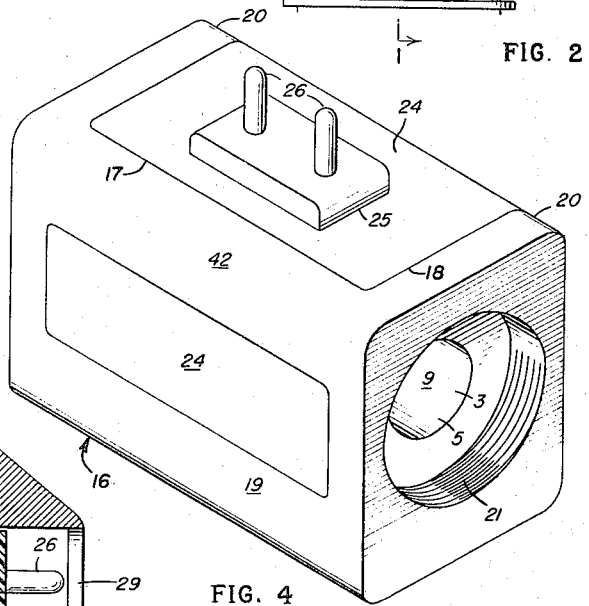
FIG. 4
Inventors:
Virgil L. Frantz
Brantley D. Switzer, Jr.
By Wilmer Mechlin
their Attorney

United States Patent Office 3,377,046
Patented Apr. 9, 1968

3,377,046
SOLENOID VALVE AND METHOD
Virgil L. Frantz and Brantley D. Switzer, Jr., Salem, Va., assignors, by direct and mesne assignments, to Graham-White Sales Corporation, Salem, Va., a corporation of Virginia
Filed Oct. 9, 1964, Ser. No. 402,709
10 Claims. (Cl. 251—139)

This invention relates to solenoid valves.

The primary object of the invention is to provide an improved solenoid valve and method of making the same in which the non-magnetic metal coil or sleeve pole of a conventional solenoid valve is replaced by a non-magnetic spool on which the coil is wound and the stationary core and base are connected by a field member embracing the coil.

Another object of the invention is to provide a solenoid valve and method of making the same, wherein the coil is wound on a non-metallic spool and molded in a plastic coating which is applied after seating of the coil in the metal containing it in the completed valve and without bonding of the coating to the metal, thereby inhibiting cracking of the coating on exposure of the valve to variations in temperature because of differences in the coefficients of expansion of the coating and the metal.

A further object of the invention is to provide a method of making a solenoid valve wherein, by pretreating with a release agent the metal in which the coil is contained in the completed valve, the coil is enabled to be molded in place in a plastic coating, using the containing metal at least in part as the mold and without risk of bonding of the coating to the metal.

Other objects and advantages of the invention will appear hereinafter in the detailed description, be particularly pointed out in the appended claims and be illustrated in the accompanying drawings, in which:

FIGURE 1 is a central vertical sectional view of a preferred embodiment of the solenoid valve of the present invention, taken along lines 1—1 of FIGURE 2;

FIGURE 2 is a fragmentary side elevational view of the valve of FIGURE 1;

FIGURE 3 is a horizontal sectional view taken along lines 3—3 of FIGURE 1; and

FIGURE 4 is a perspective view of the valve with the base and pole head removed.

Referring now in detail to the drawings in which like reference characters designate like parts, the improved solenoid valve of the present invention is comprised of a coil 1 wound on a rigid spool or bobbin 2 about the spool's body 3 and between its end flanges 4. At least the body, tube or cylinder 3 of the spool 2 is made of rigid plastic and preferably of "nylon" or like material that not only is non-magnetic but has substantial lubricity.

The spool 2 has in its body 3 a preferably smooth, cylindrical bore 5, in one or an upper end portion 6 of which seats or is received a magnetic metal core or pole head member 7, conveniently formed as the integral stem of a magnetic headed plug 8, and the opposite, other or lower end portion 9 of which forms the upper or inner part of a preferably bi-diameter valve chamber 10. Contained and reciprocable axially or longitudinally in the valve chamber is a magnetic plunger or valve member 11 which engages and rides or slides against the side of the bore 5 to guide it in its movements. The lower or outer part of the chamber 10 into which the plunger 11 projects beyond or below the spool 2, is formed by a cavity or recess 12 in a suitable metal or other base 13. Preferably cylindrical and concentric or axially aligned with the bore 5, the illustrated cavity 12 is of larger diameter or cross-section than the bore to contain a return spring 14 which acts between the adjoining end of the spool 2 and a radially outstanding flange 15 on the bottom of the plunger 11, for yieldably holding the latter in retracted position except when the coil is energized.

The plug 8 and base 13 are releasably connected to each other and the spool 2 by a metal connector 16 which contains or surrounds and axially or longitudinally embraces the spool and is magnetic to enable it to act as a bridge or field piece for the coil 1. The coil 1 and its spool 2, hereinafter sometimes termed collectively "spooled coil," are contained in a pocket 17 in the connector or bridge 16 into which they are inserted or slid through an access opening 18 preferably in the connector's side or side wall 19. The preferred connector 16 is of somewhat C-shape, with substantially parallel, generally rectangular arms or end walls 20 at its ends, and has its side wall 19 formed by a main web connecting the arms at one side. Through each arm extends one of a pair of threaded apertures 21 coaxial with each other and the bore 5 of the spool 2, into opposite of which the upper or inner end 22 of the base 13 and the enlarged head 23 of the plug 8 are screwed or threaded from opposite ends of the connector.

The basic valve is completed by an epoxy or like suitable plastic coating 24 which is molded around and embeds or encases the coil 1 and also partly embeds and locks in place at the front of the valve an insulator block 25 of "nylon" or like suitable material mounting the preferred hollow terminals 26 of the coil. In the illustrated valve the connector 16 is enclosed in a housing or casing 27 which is open at one end for receiving the connector, inner end first, has a threaded aperture 28 at its opposite end for enabling the plug 8 to be screwed or threaded therethrough and lock the connector in place, and exposes the terminals 26 through a side opening 29.

The illustrated valve has valve seats 30 at opposite ends of the valve chamber 10, one in the base 13 leading to a lower port 31 and the other in the core 7 leading through an axial passage 32 therein to an upper port 33. An intermediate port 34 opens from a side onto the chamber 10. The plunger 11 has flats 35 at its sides therebetween and a side of the bore 5 to provide side passageways 36, and depends for alternately closing the seats 30 upon internal rubber or like discs 37, which, for AC installations, are urged oppositely by a compression spring 38 to prevent chattering of the plunger when the coil is energized. Normally held by the return spring 14 against the base or lower seat 13 and so connecting the upper and intermediate ports 33 and 34, the plunger 11, on polarizing of itself and the core 7 by energizing or flow of current through the coil 1, is pulled by the core away from the lower and against the upper seat, thus shutting off the upper port and connecting the intermediate port to the lower port 31. For testing the fluid circuit in which it is connected, without operation of the electrical circuit, the illustrated valve has in its base 13 a push rod 39 engagable with the bottom of the plunger 11 for manually unseating the latter, and the joints around the push rod, the core 7 and the base are suitably sealed by O-rings 40.

The conventional solenoid valve has its coil protected by a coating which is applied to the coil before it is assembled. By contrast, in the valve of this invention the coil 1 is uncoated when slid or inserted laterally or radially into the access opening 18 in the connector 16 and the coating 24 is molded in place before the plug 8 and base 13 are applied. During the molding, the ends of the bore 5 are plugged by temporary plugs (not shown) screwed into the apertures 21 in the arms 20 and the insulator block 25 mounting the terminals 26 is positioned by a suitable fixture. With a partial mold (not shown) covering the open portion of the side 19 of the connector 16, the pocket 17 is vacuum impregnated or otherwise filled with the epoxy or other plastic which is to form the coating 24. Once hardened, the coating forms an effective seal about the coil 1 and also locks the insulator block 25 in place. On subsequent removal of the temporary plugs and any part of the mold, the plug 8 and base 13 are inserted to complete the assembly.

Were the above the extent of the process, the plastic coating 24 would bond to the metal connector 16 as well as to the coil 1 and the different coefficients of expansion of the coating and the connector would set up stresses of sufficient order to crack the coating. While a crack in the joint between the coating and the connector would be acceptable, tests have shown that the stress cracks, instead, are almost invariably through the coating of the coil, with the result that, once cracked, the coating no longer serves its main purpose of protecting the coil against the elements. It has been found that any tendency of the coating to crack can be eliminated by spraying or otherwise pretreating at least those surfaces of the connector 16 and, if used, the housing 27, which are exposed during molding to the plastic, to cover such surfaces with a film or coat 41 of a suitable release agent. For the preferred epoxy or other plastic coating material, any silicone mold release, such as Dow Corning #7 or #20 dissolved in xylol, is a satisfactory release agent. So pretreated, the metal containing the coil is immune from bonding to the coating during molding and there cannot be any subsequent cracking of the coating from this cause. The only other possible cause of cracking would be internal stressing of the coating and this is effectively avoided by the judicious selection of the plastic materials of which the spool 2 and coating 24 are made to ensure that, as in the case of the exemplary "nylon" spool and epoxy coating, the coefficients of expansion of the two are practically the same. Structurally, a desirable addition to the preferred C-shaped connector 16, in view of the lack of a bond between it and the coating, is a second or auxiliary web or strap 42 joining the arms 20 at the side or corner and spaced laterally from the main web 19, so that the coated coil between the webs is held against lateral or rotary movement under service forces.

A further feature of the preferred valve and a marked distinction over conventional solenoid valves is in the connection between the coil 1 and the terminals 26. Conventionally, the terminals of solenoid valves have leads which are soldered to the ends of the coil. It is almost impossible to make such a connection without leaving excess wire which can cause shorting and other difficulties. Instead, in the preferred valve, the bare ends 43 of the coil 1 are connected directly to the terminals 26 without any excess wire. This is accomplished before application of the coating 24 by inserting the coil ends 43 into the inner ends of the then open-ended terminals 26, and drawing them therethrough to eliminate any excess wire between the terminals and the coil 1. Thereafter, the outer ends of the terminals 26 are soldered closed, in process soldering thereto the coil ends 43, and any excess wire projecting beyond the soldered joint is then cut off.

From the above-detailed description, it will be apparent that there has been provided an improved solenoid valve and method of making it, which not only eliminates the non-magnetic metal coil pole of a conventional solenoid valve, but enable the coating of the coil to be molded in place without danger of cracking in service. It should be understood that the described and disclosed embodiment is merely exemplary of the invention and that all modifications are intended to be included that do not depart from the spirit of the invention or the scope of the appended claims.

Having described our invention, we claim:

1. A solenoid valve comprising a plastic-bodied spool having an axial bore, a coil wound on said spool, a magnetic core in one end portion of said bore, a base at an opposite end of said bore, a plunger in the other end portion of said bore and projecting into said base, a magnetic field member containing and embracing opposite ends of said spool and coil and connecting said core and base, and a plastic coating molded in place in said field member about said coil.

2. A solenoid valve comprising a plastic-bodied spool having an axial bore, a coil wound on said spool, a magnetic core in one end portion of said bore, a base at an opposite end of said bore, a plunger in the other end portion of said bore and projecting into said base, a magnetic field member containing said spool and coil and connecting said core and base, a plastic coating molded in place in said field member about said coil, and a releasing agent on any surface of said connector confronting said coating for preventing bonding thereof during molding of said coating.

3. A solenoid valve comprising a plastic-bodied spool having an axial bore, a coil wound on said spool, a magnetic core in one end portion of said bore, a base at an opposite end of said bore, a plunger in the other end portion of said bore and projecting into said base, a magnetic field member containing and embracing opposite ends of said spool and coil and releasably connecting said core and base, and a plastic coating molded in place in said field member about said coil and substantially filling said member thereabout.

4. A solenoid valve comprising a plastic spool having an axial bore, a coil wound on said spool, a magnetic core in one end portion of said bore, a base at an opposite end of said bore, a plunger in the other end portion of said bore and projecting into said base, a magnetic field member containing and embracing opposite ends of said spool and coil and connecting said core and base, and a plastic coating molded in place in and substantially filling said member about said coil.

5. A solenoid valve comprising a plastic-bodied spool having an axial bore, a coil wound on said spool, a magnetic core in one end portion of said bore, a base at an opposite end of said bore, a plunger reciprocable against yieldable resistance in the other end portion of said bore and projecting into said base, a magnetic field member containing said spool and coil and connecting said core and base, a plastic coating molded in place in and substantially filling said member about said coil, and a release agent on any surface of said connector confronting said coating for preventing bonding thereof during molding of said coating.

6. A solenoid valve comprising a plastic-bodied spool having an axial bore, a coil wound on said spool, a magnetic core in one end portion of said bore, a base at an opposite end of said bore, a plunger in the other end portion of said bore and projecting into said base, a magnetic field member containing said spool and coil and connecting said core and base, a plastic coating molded in place in and substantially filling said member about said coil, an insulator block embedded in said coating, inwardly opening hollow terminals mounted in said block and receiving ends of said coil, and soldered joints closing outer ends of said terminals and connecting said coil ends thereto.

7. A solenoid valve comprising a plastic spool having an axial bore, a coil wound on said spool, a magnetic core in one end portion of said bore, a base at an opposite end of said bore, a plunger in the other end portion of said bore and projecting into said base, a magnetic field member containing said spool and coil and connecting said core and base, a plastic coating molded in place in and substantially filling said member about said coil, an insulator block embedded in said coating and mounting terminals for said coil, and a casing enclosing said member and releasably connected thereto by said core.

8. A solenoid valve comprising a plastic-spool having an axial bore, a coil wound on said spool, a magnetic field member containing and embracing opposite ends of said spool and coil, a base and a magnetic plug releasably connected to said member at opposite ends of said spool, said plug having a stem received in an end portion of said bore, a plunger in an opposite end portion of said bore and extending into said base, a plastic coating molded in place in and substantially filling said member about said coil, and an insulator block embedded in said coating and mounting terminals for said coil.

9. A method of making a solenoid valve comprising winding a coil on a plastic-bodied spool, inserting said coil and spool into a magnetic field member, molding a plastic coating in said member about said coil after treating with a release agent any surface of said member confronting said coating, and inserting into opposite end portions of an axial bore in said spool through adjoining ends of said connector a magnetic core and a magnetic plunger partly contained in a base, while connecting said core and base to said member.

10. A method of making a solenoid valve comprising winding a coil on a plastic spool having an axial bore, inserting said coil and spool into a pocket in a magnetic field member after treating any surface of said pocket with a release agent for a plastic material, vacuum molding a coating of said material in said pocket about said coil, inserting into opposite end portions of said bore a magnetic core and a reciprocable plunger, and connecting said core and a base partly containing said plunger to said member at opposite ends of said spool.

References Cited

UNITED STATES PATENTS

| | | | |
|---|---|---|---|
| 2,807,688 | 9/1957 | Fischer, et al. | 335—255 X |
| 2,880,401 | 3/1959 | Mercier | 336—96 |
| 2,887,125 | 5/1959 | Lucien | 251—129 X |
| 2,914,600 | 11/1959 | Smith et al. | 336—96 X |
| 2,947,284 | 8/1960 | Nicholson | 251—139 X |
| 3,035,611 | 5/1962 | Collins | 251—129 X |
| 3,082,359 | 3/1963 | Mangiafico | 251—141 X |
| 3,172,637 | 3/1965 | Adams, et al. | 251—139 X |
| 3,185,177 | 5/1965 | Brandenberg, et al. | 251—139 X |
| 3,232,312 | 2/1966 | Lansky, et al. | 251—139 X |

OTHER REFERENCES

Electronic Design, May 13, 1959, "Methods of Encapsulating Electronic Parts in Epoxy," C. H. Carter, pp. 26 and 27.

M. CARY NELSON, *Primary Examiner.*

R. C. MILLER, *Assistant Examiner.*